United States Patent [19]

Preniczny et al.

[11] Patent Number: 4,569,600
[45] Date of Patent: Feb. 11, 1986

[54] BRAKE TEMPERATURE SENSOR

[75] Inventors: Robert B. Preniczny; Bruce W. Anderson, both of South Bend, Ind.

[73] Assignee: Allied Corporation, Morristown, N.J.

[21] Appl. No.: 478,191

[22] Filed: Mar. 24, 1983

[51] Int. Cl.⁴ .............................................. G01J 5/08
[52] U.S. Cl. ................................... 374/131; 188/1.11; 340/52 B; 374/141
[58] Field of Search ................. 374/130, 131, 141; 340/52 A, 52 B, 600; 356/44; 188/1.11

[56] References Cited

U.S. PATENT DOCUMENTS

| 3,201,584 | 8/1965 | Mullenger | 374/131 X |
|---|---|---|---|
| 3,510,835 | 5/1970 | Gilbert | 340/595 X |
| 3,584,509 | 6/1971 | Compton | 374/131 X |
| 3,820,105 | 8/1974 | Horsch | 374/185 X |
| 3,958,445 | 5/1976 | Howard et al. | 340/52 A X |
| 3,975,706 | 8/1976 | Kato | 340/52 A |
| 4,037,473 | 7/1977 | Compton et al. | 374/131 X |
| 4,184,145 | 1/1980 | Fima | 340/52 A |
| 4,241,603 | 12/1980 | Han et al. | 188/1.11 X |

FOREIGN PATENT DOCUMENTS 2829154  1/1980  Fed. Rep. of Germany ...... 374/131

Primary Examiner—Daniel M. Yasich
Attorney, Agent, or Firm—Leo H. McCormick, Jr.; Ken C. Decker

[57] ABSTRACT

In a brake assembly (10) having an infrared fiber optic element (54) for transmitting an operational signal to a sensor (66) through which an indicator (68) is provided with a substantially instantaneous indication of the temperature of the brake stack (26).

6 Claims, 4 Drawing Figures

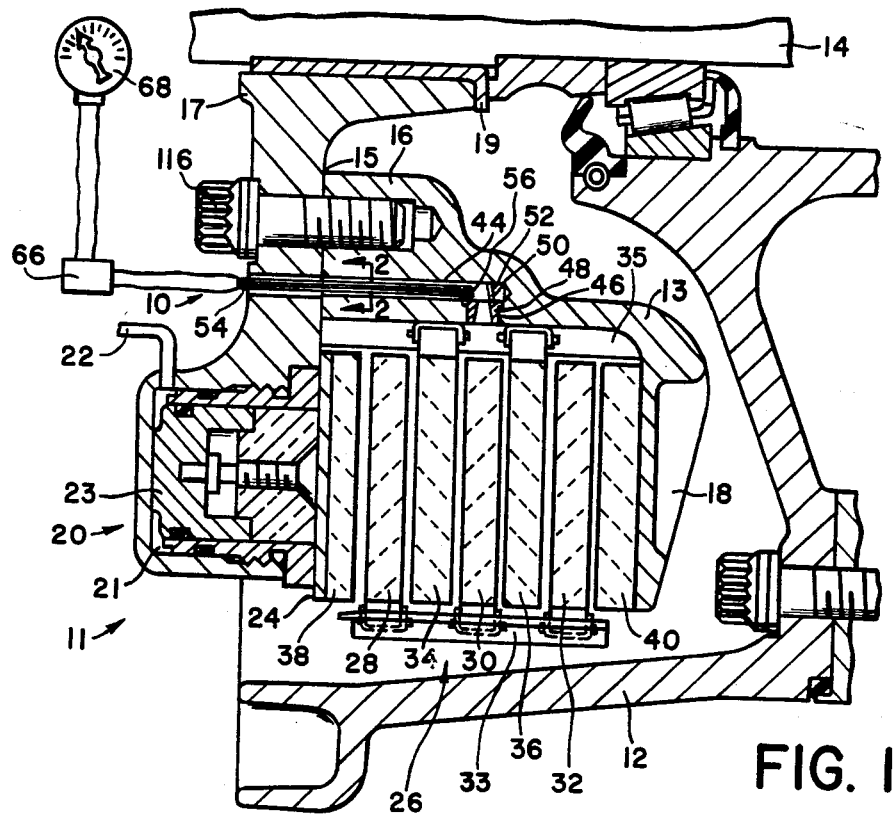
FIG. 1
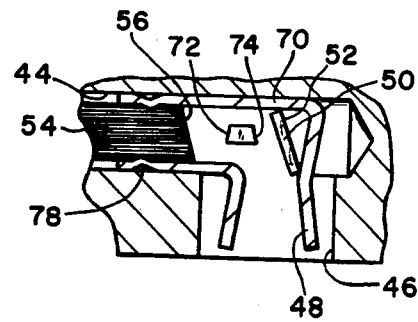
FIG. 2
FIG. 3
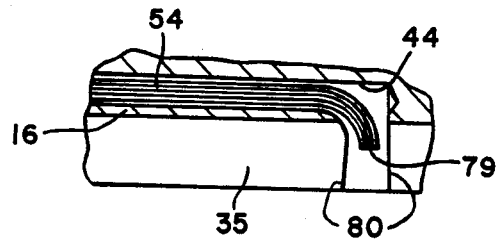
FIG. 4

BRAKE TEMPERATURE SENSOR

This invention relates to a brake having a fiber optic element responsive to infrared signals for providing an indicator with substantially an immediate indication of the temperature of the friction discs in the brake.

Some airlines require that an aircraft be equipped with a temperature monitoring system which is capable of monitoring the temperature of the aircraft brake so that the pilot can be assured that the brakes are cool enough to provide a safe "rejected take-off" capability when the aircraft takes off and to assure that the brake temperature is low enough not to ignite any fluid from hydraulic leaks with the landing gear retracted.

The major problem is existing aircarft brake thermal sensors is the "time-lag" of the monitored or indicated temperature with respect to the actual brake temperature. This time lag is due to the fact that the thermal sensors have heretofore been located away from the hottest part of the brake. Due to the location of the sensors, they tend to be affected by heat sources other than the brake, and the ratio of sensor to heat sink temperature may also be affected by air movement and contamination from the environment.

SUMMARY OF THE INVENTION

The brake in the present invention has a torque tube with an axial bore that extends to a slot located adjacent the friction disc. A fiber optic element located in the axial bore receives infrared signals that pass through said slot. The infrared signals are transmitted to a sensor to provide an indicator with a substantially instantaneous reading indicative of the temperature of the friction discs.

An advantage of this invention results in the instantaneous temperature indication of the friction discs by eliminating time lag caused by conductive sensing of temperature.

It is therefore an object of this invention to provide an aircraft with a brake temperature monitoring device that can provide a substantially direct temperature reading of the friction discs thereby assuring the capability of a safe rejected take-off capability while the aircraft is on the ground and safe brake temperature while in flight.

It is a further object of this invention to provide a brake with a fiber optic element responsive to an infrared signal generated by friction disc to provide an indicator with a reading indicative of the temperature thereof.

These and other features should be apparent from reading the specification while viewing the accompanying drawings.

BRIEF DESCRIPTION OF THE DRAWINGS

FIG. 1 is a sectional view of an aircraft brake assembly having a fiber optic element as disclosed by this invention for monitoring the temperature of friction discs;

FIG. 2 is a sectional view taken along lines 2—2 showing a bundle of fiber optics through which infrared signals are transmitted to a sensor; and FIG. 3 is an enlarged view of a secondary retention element for a mirror and fiber optic bundle of the type disclosed in the invention.

FIG. 4 illustrates an alternate method whereby the fiber optic bundle is aligned with the cone to directly receive infrared signals from the brake.

DETAILED DESCRIPTION OF THE INVENTION

FIG. 1 illustrates an aircraft brake infrared fiber optic element 10 in an aircraft brake assembly 11 associated with a wheel rim 12 rotating about an axle 14. A nonrotating torque tube 16 has a first end 15 secured to carrier member 17 by bolts 116. The carrier member 17 is fixed to axle 14 by key 19. The torque tube 16 has an annular backing plate 18 which extends from a second end thereof toward wheel 12. The carrier member 17 has a series of cavities 21 with actuator assemblies 20 located therein. The actuator assemblies 20 each have a piston 23 attached to a pressure plate 24. The pressure plate 24 is in axial alignment with the backing plate 18. A conduit 22 communicates hydraulic fluid into the piston actuator assemblies 20 to move pressure plate 24 toward the backing plate 18. A braking stack 26 includes rotor friction discs 28, 30 and 32 mounted for rotation with the rim of wheel 12 by splines 33 and non-rotating stator friction discs 34 and 36 mounted on torque tube 16 by splines 35 located between the pressure plate 24 and backing plate 18. In addition, non-rotating friction discs 38 and 40 are carried by pressure plate 24 and backing plate 18, respectively.

The torque tube 16 has an axial bore or groove 44 that extends to a slot 46 located between the first end 15 and second end 13. The position of the slot 46 is selected to represent the area wherein the greatest thermal energy is generated by the friction discs. A transverse hole in the torque tube or a cone member 48 attached to the torque tube 16 concentrates and directs infrared signals generated by the friction discs into bore 44. The hole or cone member 48 is oriented downward with respect to axle 14 to substantially eliminate the collection of contaminants therein. A mirror 50 located in a groove 52 receives the infrared signals and aligns and redirects the same 90° in an axial path in said bore 44.

A bundle of fiber optic elements 54, see FIG. 2, located in bore 44 has an end 56 that is positioned adjacent mirror 50. The end 56 is cut on an angle such that the distance between mirror 50 and an individual filament in the bundle of fiber optic elements is substantially constant to prevent distortion of the infrared signals. As shown in FIG. 2, the bundle of fiber optics has a series of tabs 58 and 60 located in grooves 62 and 64, respectively, that retains the fiber optic element 54 in a non-rotatable or indexed position.

The fiber optic element 54 is connected to a sensor 66 which responds to infrared signals and provides indicator 68 with an indication of the temperature of the friction disc.

Under some conditions it may be desirable to mechanically affix or bond the outside of the bundle fiber optic elements 54 to bore or groove 44 to assure that the end 56 remains in a stationary relationship with mirror 50.

In another embodiment shown in FIG. 3, independent sleeve member 70 is designed to hold both a mirror 50 and the end 56 of the bundle of fiber optic element 54 in a fixed position. The sleeve member 70 has a series of tabs 72, only one is shown, at least one of which engages or snaps into a groove 74 in the torque tube 16 to hold the aperture cone 48 in a fixed position while tabs 78 are designed to grip the end 56 of the bundle of fiber optic element 54.

MODE OF OPERATION OF THE INVENTION

When a brake application is effected, hydraulic fluid is introduced via conduit 22 into the actuator assembly 20. The hydraulic fluid acts on each piston 23 to move pressure plate 24 toward the backing plate 18. This linear motion forces the rotating and non-rotating friction discs of braking stack 26 into frictional engagement to create a frictional force opposing the rotation of the rotating friction discs 28, 30 and 32 attached to the wheel rim 12.

During such a brake application the friction discs generate thermal energy and produce infrared signals. Some of the infrared signals are transmitted to the aperture of cone member 48 to mirror 50. The mirror 50 redirects or reflects the infrared signals into the end 56 of the fiber optic element 54 for distribution to sensor 66. Sensor 66 analyzes the infrared signals and converts the same into an operational signal that is transferred to indicator 68. The pilot (or other monitor device) on scanning the indicator 68 can observe the temperature of the friction disc at substantially the same time the thermal energy is generated.

In an effort to simplify the construction of the brake assembly and avoid distortion that may occur through the reflection of mirror 50, the end 79 of the fiber optic element 54 is aligned with an aperture of cone member 80 as shown in FIG. 4. The end 79 is straight or located in a plane substantially perpendicular to the discs of braking stack 26. End 79 directly receives the infrared ray produced through the creation of thermal energy by the engagement of rotating disc 28, 30, and 32 with the stationary disc 34, 36, 38 and 40 and transmits the same to sensor 66 where the information in converted into an operational signal for display on indicator 68.

We claim:

1. In a brake assembly having a carrier member fixed to an axle of a vehicle, a torque tube having a first and secured to said carrier member and an annular backing plate extending from a second end, an actuator device retained in a cavity in said carrier member, said actuator device having a pressure plate aligned with said backing plate, a plurality of friction discs located between said pressure plate and said backing plate, said actuator device responding to an input by moving said pressure plate toward said backing plate to effect a brake application, said plurality of friction discs generating thermal energy during said brake application, the improvement wherein said torque tube has an axial bore extending from said first end to a slot between said first and second ends, a cone member having an aperture portion that extends from said slot, a mirror located in said axial bore adjacent said slot, a fiber optic element located in said bore with a first end aligned with said mirror and a second end connected to a sensor and means for holding said first end of said fiber optic element in a fixed position with respect to said mirror, said aperture portion of said cone member directing infrared signals produced by said thermal energy toward said mirror, said mirror directing said infrared signals into said first end of said fiber optic element, said fiber optic element carrying said infrared signals to said sensor to provide an indicator with a substantially instantaneous reading indicative of the temperature of said friction discs.

2. In the brake as recited in claim 1 further includes an attachment member connected to said fiber optic element and said axial bore to hold said end in a substantially fixed position with respect to said mirror.

3. In the brake as recited in claim 1 further includes a sleeve having a series of tabs thereon located in said axial bore, said sleeve having a groove for holding a mirror in a fixed position, a portion of said tabs engaging said torque tube for holding the sleeve in a fixed position while the remaining tabs engage said fiber optic element to fix the end thereof with respect to the mirror to fix the distance therebetween and the wave path between each filament of the fiber optic element and the mirror.

4. The brake as recited in claim 1 wherein said end of said fiber optic element and said mirror are positioned such that said infrared signals are received by said sensor without distortion.

5. In a brake assembly having a carrier member fixed to an axle of an aircraft, a torque tube having a first end secured to said carrier member and an annular backing plate extending from a second end, an actuator device retained in a cavity in said carrier member, said actuator device having a pressure plate aligned with said backing plate, a plurality of friction discs located between said pressure plate and said backing plate, said actuator device responding to hydraulic fluid by moving said pressure plate toward said backing plate to effect a brake application, said plurality of friction discs generating thermal energy during said brake application said thermal energy producing infrared signals, the improvement wherein said torque tube has an axial bore that extends through a wall in said carrier to an apertured hole located between said first and second ends, a fiber optic element located in said axial bore with a first end positioned in said apertured hole and a second end connected to a sensor located in said aircraft, and means for holding a portion of said first end of said fiber optic element in a fixed position such that an end surface is substantially perpendicular to said plurality of friction discs, said infrared signals produced by said thermal energy being received by said end surface where said fiber optic element carries said infrared signals to said sendor to provide an indicator with a substantially instantaneous reading indicative of the temperature of said friction discs.

6. In the brake assembly as recited in claim 5 wherein said apertured hole is located between said axle and actuator device to reduce the possibility of contamination affecting the communication of infrared signals to said end surface of the fiber optic element.

* * * * *